Nov. 20, 1962

F. E. HOLLADAY 3,064,886

DOCUMENT HANDLING MACHINE

Filed Nov. 28, 1958

INVENTOR.
FORREST E. HOLLADAY.
BY
*Wallace P. Lamb*
ATTORNEY.

United States Patent Office 3,064,886
Patented Nov. 20, 1962

3,064,886
DOCUMENT HANDLING MACHINE
Forrest E. Holladay, Plymouth, Mich., assignor to Burroughs Corporation, Detroit, Mich., a corporation of Michigan
Filed Nov. 28, 1958, Ser. No. 776,891
9 Claims. (Cl. 235—61.11)

This invention relates generally to accounting apparatus and particularly to a machine for feeding record cards to a reading device.

In certain types of business or accounting apparatus, it is desirable to automatically transmit information, such as an old balance, from a record card to a remote accounting machine such as by means of a transducer or magnetic read device. To accomplish this, the card is provided thereon with a stripe of magnetic material encoded to represent certain information and the card is fed to the magnetic read device which, in response to the encoded material, effects corresponding pulses for conduction to a read-in device of the accounting machine. In practice, a number of stacked cards, arranged in a predetermined order are fed singly to the read device along a path of travel with the magnetic stripe on the card passing longitudinally of the read device so that encoded information spaced longitudinally of the stripe is read successively by the read device. In such card feed machines, it is essential that the stripe be accurately registered with the read device if all of the information on the stripe is to be read, and it is the principal object of the invention to provide such a machine in which the accuracy of alignment of the stripe with the read device is assured.

In connection with the above object, it is another object to provide a card feed machine in which the direction of feeding of the card enroute to a read device is changed both for the purpose of effecting proper alignment of the magnetic stripe with the read device and for overcoming economically the well known difficulty of feeding cards from a stack that is lower on one side than the other because of the added thickness of the stripe material.

Another object of the invention is to provide an improved card feed machine in which the card is fed to a registering station in which is located normally open bite feed rollers that close on the card at the registering station and only in response to proper alignment of the card for travel past a read device.

Another object of the invention is to provide an improved machine of the above-mentioned character in which the output of the information reading device is controlled in response to alignment therewith of a card enroute to the reading device.

A further object of the invention is to provide an information reading device under control of card actuated controls in such manner that the read device output will be transmitted only in response to a card of particular configuration.

Other objects of the invention will become apparent from the following detailed description taken in connection with the accompanying drawings in which.

Referring to the drawings by characters of reference, the apparatus shown comprises in general, a support or base 20, a card feed means or conveyor 22, and a second card feed means or drum 24. The cards, designated by the numeral 26, each may have one or more magnetic stripes 28 thereon polarized in part in a manner to represent information which may be, for example, the old balance of an account to be transferred to an accounting machine, such as the accounting machine shown in the co-pending application of William W. Deighton et al., Serial No. 598,454, filed July 17, 1956. The card 26 is fed along a path of travel by the conveyor 22, with the magnetic stripes 28 facing downwardly and transversely to the path of travel, to a card registering station 30 whence the card, if accurately registered is fed by drum 24 along a second path of travel transverse to the first, the stripes passing lengthwise thereof over a magnetic read device 32 that is mounted near the drum.

The base 20 may be a fabricated frame structure comprising upright members 34, side members 36 and cross members 38. These structural members may be welded or be otherwise suitably secured together to provide a rigid supporting structure.

Figures 7, 8:
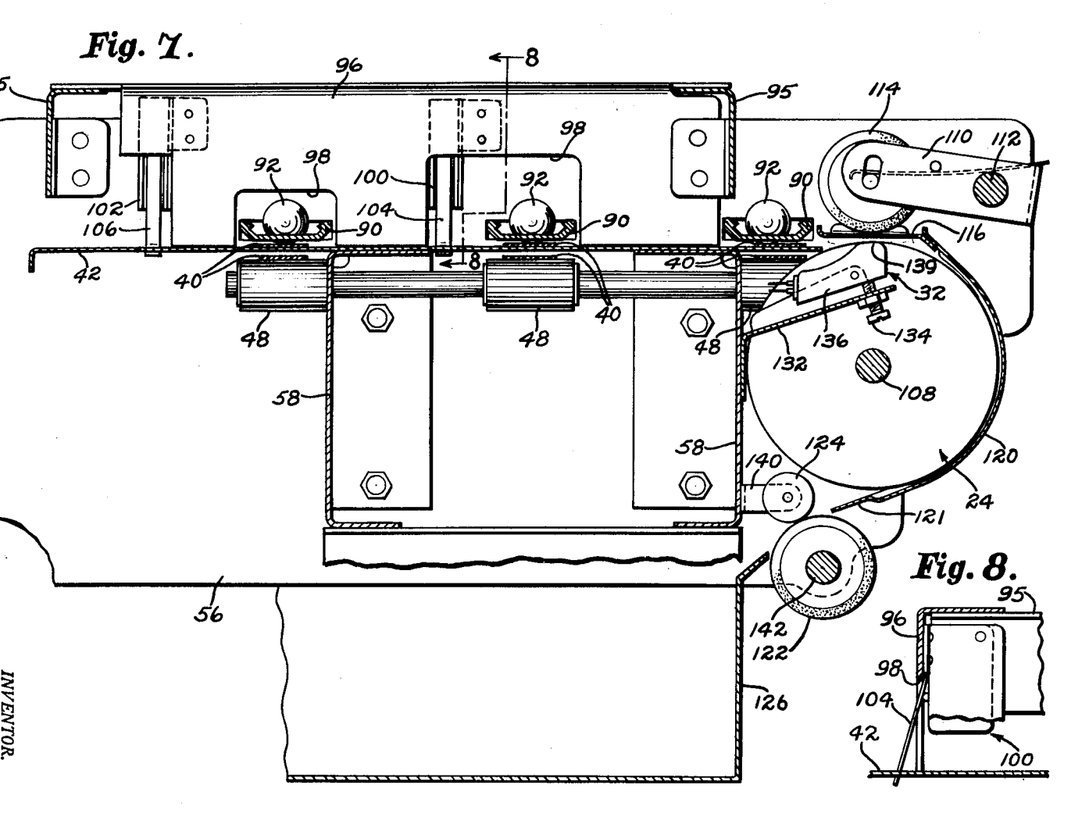
FIG. 7 is a cross-sectional view, taken along the line 7—7 of FIG. 2.
FIG. 8 is a vertical sectional view, taken along line 8—8 of FIG. 7.

The conveyor 22 includes a plurality of horizontally spaced parallel belts 40, the upper or lead sides of which slide on the upper surface of a horizontal support or plate 42 disposed between a driving roller 44 and a driven roller 46 around which the belts 40 travel. The rollers 44 and 46 are spaced apart longitudinally of the base 20, and preferably guide rollers 48 are provided for the trailing sides of the belts and one of said guide rollers may be adjustable to adjust the belt tensions in the well known manner. At the feed end of the conveyor, the driving roller 44 extends axially between and is journaled on oppositely disposed upright side plates 50 and 52 which are rigidly mounted on and extend upwardly from the top of the base 20. Forwardly of the driving roller 44 is an upright supporting plate 54 that extends between the side plates 50 and 52 and is rigidly secured thereto, and at the rear of the conveyor, a similar plate 56 is rigidly secured to and extends upwardly from the base 20. Extending between and rigidly secured to plates 54 and 56 is a pair of laterally spaced parallel structural members 58 that are preferably channel shape in cross section and are rigidly secured at the opposite ends thereof to the plates 54 and 56. The channel members 56 support the horizontal plate 42 on which the lead sides of the belts 40 slide as shown in FIG. 7, and the driven roller 46 and guide rollers 48 are journaled for rotation in the upright webs of the channel members 56 which are arranged in staggered relation to the belts 40.

Adjacent and forwardly of the driving roller 44 is a lower card feed driving roller 60 and a plurality of upper driven rollers 62 which are journaled for rotation in the upright side plates 50 and 52. The upper and lower rollers 60 and 62 are arranged to cooperate in the feeding of a card to the conveyor 22, the card being supported enroute to the conveyor on a sheet metal support 64 that is interposed between the rollers 60, 62 and the driving roller 44 of the conveyor 22. The shafts of the lower roller 60 and of the conveyor driving roller 44 project outwardly of side plate 52 and are provided thereon with gears 66 and 68, respectively, which are in mesh with and are both driven by a gear 70 which is in turn driven by a gear 72 on a driven pulley 74. Pulley 74 is driven by an electric motor 76 through a conventional speed reduction mechanism in a housing 78, the speed reduction mechanism having a drive pulley 80 connected to driven pulley 74 by a belt drive 82. In the present arrangement, the drive shaft, as at 84, connecting the motor 76 and the speed reduction mechanism in housing 78, is additionally journaled and supported by a standard 86 intermediate the housing 78 and motor 76.

Forwardly of the feed rollers 60 and 62 is a table 88 for supporting a stack of the cards 26 to be fed to the bite of the feed rollers 60, 62. Any suitable type of card feeder (not shown) that is adapted to feed the cards singly from the stack may be employed to feed the cards 26, such as the suction type card feeder shown and described in detail in the co-pending application of Roy L. Phelan, Serial Number 685,197, now Patent No. 2,972,444, filed September 20, 1957.

Figure 1:
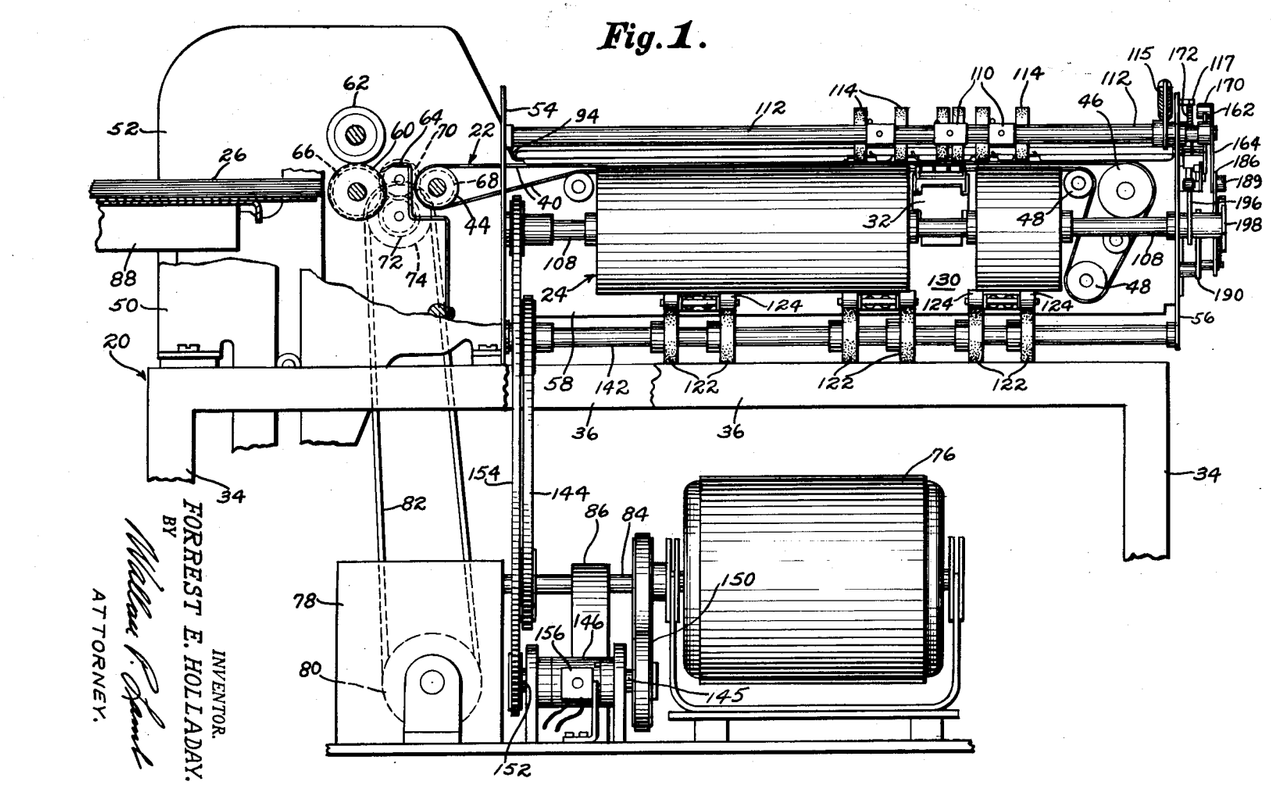
FIG. 1 is a side view partly broken away of a card feeding machine embodying features of the invention.
Figure 2:
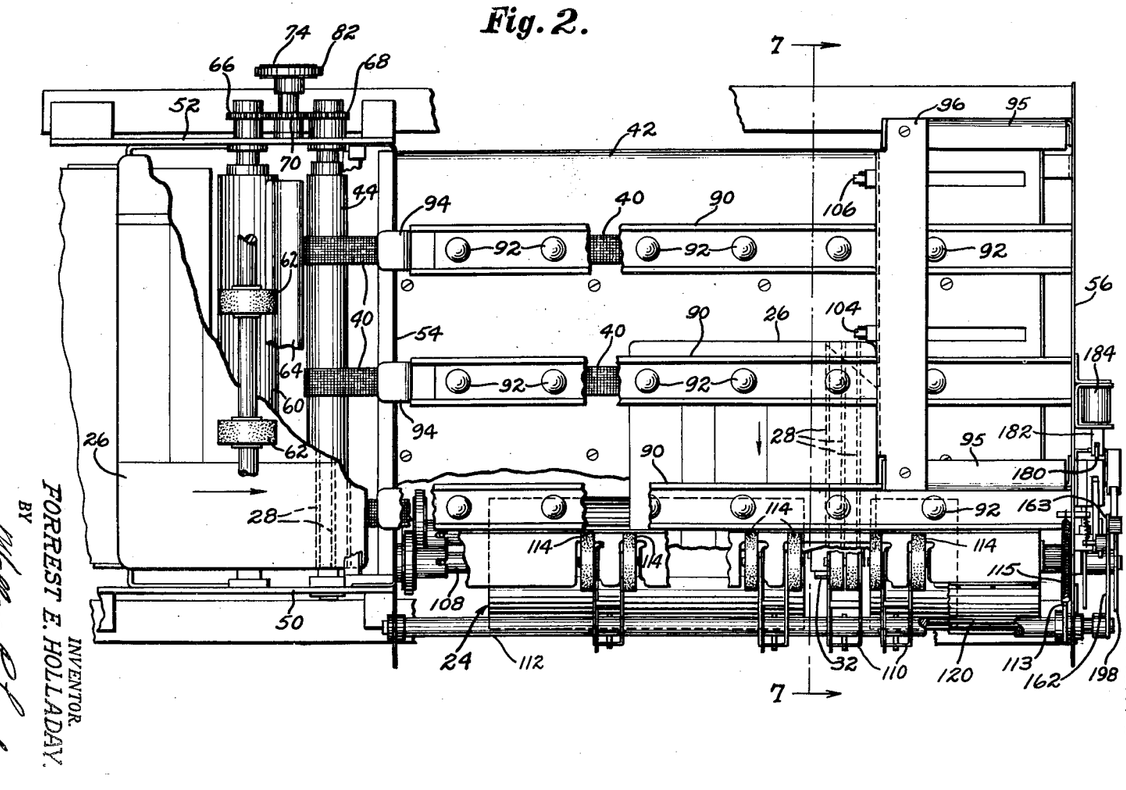
FIG. 2 is a plan view partly broken away of the machine.

Overlying each of the upper or lead sides of the belts 40 is an elongated retainer member 90 of general channel shape in cross section which extends between and is supported at its opposite ends on the plates 54 and 56. These channel members 90 are arranged such that their webs are horizontally spaced slightly above the belts 40 at a distance therefrom to provide more than adequate clearance for the passage of the cards 26 therebeneath, and each of the channel members has a number of longitudinally spaced apertures and seats for receiving metal balls 92, the function of which is to hold the cards 26 down against the belts 40 without appreciably resisting the belt feeding action of the cards. As shown, the relative diameters of the balls 92 and their seats is such that portions of the balls project below the channel members 90 for light rolling contact with the upper surfaces of the cards. At the feed end of the conveyor 22, the channel members 90 are supported on and attached to plate 54 by spring clips 94 (see FIG. 1) which curve upwardly as shown to guide the cards leaving feed rollers 60, 62 under the channel members between the balls 92 and the belts 40.

Mounted on the rear plate by supports 95 and extending across the conveyor 22 is a registering member or bar 96 which limits travel of a card on the conveyor 22 and aligns the card with the drum 24 and the magnetic stripe 28 with the read head 32. As shown in FIGS. 7 and 8, the bar 96 extends down substantially to the belt support plate 42 and has clearance cutouts 98 for the belts, the pressure balls 92 and for the channel supports 90. Since the conveyor belts 40 extend beyond the bar 96, and operate continuously, it will be understood that the action of the belts 40 is to move the card until the leading edge thereof is in over-all contact with the bar 96. Some point on the leading edge of the card strikes the bar 96 first and the action of the belts 40 moves the card about said point to square the card against the bar 96. This action assures that the magnetic stripes 28 will be accurately aligned to pass properly over the read head 32.

A pair of controls or switches 100 and 102 are mounted on the card registering bar 96 in laterally spaced relation, the switches having depending switch operators 104 and 106, respectively. Switches 100 and 102 are normally open and their operators 104 and 106 extend forwardly of the registering bar 96 in the path along which the cards 26 travel to the registering bar 96. As the card is forced against the abutment surface of bar 96, the leading edge of the card engages and moves the switch operators rearwardly to closed positions. Switch 100 controls operation of the drum 24 and switch 102 controls energization of the magnetic read device 32. At this point of the description, it will be understood that in order for a card to be fed transversely of conveyor 22 from the reading station 30 to and be read by the read device 32, it is requisite that both of the switches 100 and 102 be closed by the card. When a card becomes filled, or if for any other reason reading of the card by the magnetic read device 32 is not desired, the forward left corner of the card is removed along the dotted line 107 to clear and thus not actuate the switch operator 106.

The drum 24 is disposed laterally of the conveyor 22, the drum being mounted on a shaft 108 having its axis parallel with the path of travel of the conveyor belts 40. Opposite ends of the drum shaft 108 are journaled in the end plates 54 and 56. As is shown more clearly in FIG. 7, the belt supporting plate 42 has a side margin thereof overhanging a portion of the periphery of the drum 24 and the lead sides of the belts 40 are substantially tangent to the drum 24, the arrangement being such with respect to the width of the card that when a card is at the registering station, an outer margin of the card rests on the drum periphery, as shown. Above the drum 24, a bail 110 fixed to and on a shaft 112 carries a plurality of pressure rollers 114 which are movable down against the card to cooperate with drum 24 to feed the card past the read device 32. Also fixed to the rotatable shaft 112 is a lever 113 to the free end of which is attached one end of a helical spring 115 which is anchored at the other end thereof to a pin 117 that is fixed in and extends through plate 56. The spring 115 is tensioned and normally acts to rotate shaft 112 to move the pressure rollers 114 down into cooperative relation with the drum 24.

From the above, it will be understood that the drum 24 and pressure rollers 114 constitute a card feed means having a normally open bite into which the card is fed axially of the drum and rollers while at the same time being registered against bar 96. As a consequence, the rollers 114 and drum 24 are in position to grip the registered card and then feed it in registry with and to the read device.

Interposed between the peripheries of the drum 24 and pressure rollers 114, is a sheet metal guard 116 having slotted openings to receive the rollers 114. The guard 116 is secured to the inner surface of an arcuate sheet metal guide 120 that extends partially around the periphery of the drum 24 in spaced relation thereto that provides a chute for guiding the cards around the drum. Below the drum 24, the guide 120 has an end portion 121 tangential thereto to direct the cards to the bite of a plurality of driving rollers 122 and cooperating driven rollers 124 which feed the cards downwardly into a stacker receptacle 126 that is mounted on the base 20 below the conveyor 22.

As shown, the drum is made in two axially aligned sections spaced apart, as at 130, to receive the read device 32 therebetween. Disposed in the space between the drum sections, the read device 32 may be mounted by a bracket 132 on the web of the adjacent channel member 58 and be adjustable on the bracket 132 by an adjustment screw 134.

The magnetic read device 32 is a well known device in the art and therefore is not herein shown or described in detail. In general, such devices comprise a casing 136 in which is disposed a number of spaced apart induction coils (not shown) and cores associated therewith having pole pieces disposed toward and adjacent slot-like openings 138 in an arcuate head portion 139 of the casing over which the polarized magnetic stripe passes. The magnetic read device 32 is arranged between the sections of drum 24 and the position of the device is adjusted such that the arcuate surface of the head 139 is coincident with the drum periphery, or such that the pole pieces engage the magnetic stripes of a passing card. In the present instance, there are three of the magnetic stripes on each of the cards 26 and therefore, the read device 32 has three induction coils for responding respectively to the information on the three magnetic stripes shown on the present card. In conventional magnetic read devices, the induction coils and their cores are insulated from each other by a suitable resin in which the pole pieces are encased except for the pole piece ends thereof, designated by the numerals 138.

The rollers 124 (see FIG. 7) may be mounted in pairs on brackets 140 which may in turn be mounted on the web of the adjacent channel member 58. The driving rollers 122 are preferably mounted below the rollers 140 on a rotatable shaft 142 which may be journaled in the upright plates 54 and 56. The shaft 142 and therefore feed rollers 122 and 124 are driven by the electric motor 76, such as by a pulley and belt drive connection 144, that connects the motor drive shaft 84 to the driven shaft 142. The rollers 122, 124, are driven continuously during operation of the motor 76.

Operatively connecting the motor 76 and the drum shaft 96 is a conventional clutch 146 of the well known type that is spring biased to clutch engaged position. The clutch 146 has a driven shaft 148 that may be connected by a pulley and belt drive connection 150 to motor drive shaft 84 and has a driving shaft 152 connected by suitable pulley and belt connection 154 to the drum shaft 96. A solenoid 156 is provided to actuate the clutch 146 and is operable when energized to engage the clutch against the clutch spring action. Energization of solenoid 156 is under control of the card actuated switch 104.

Figure 3:
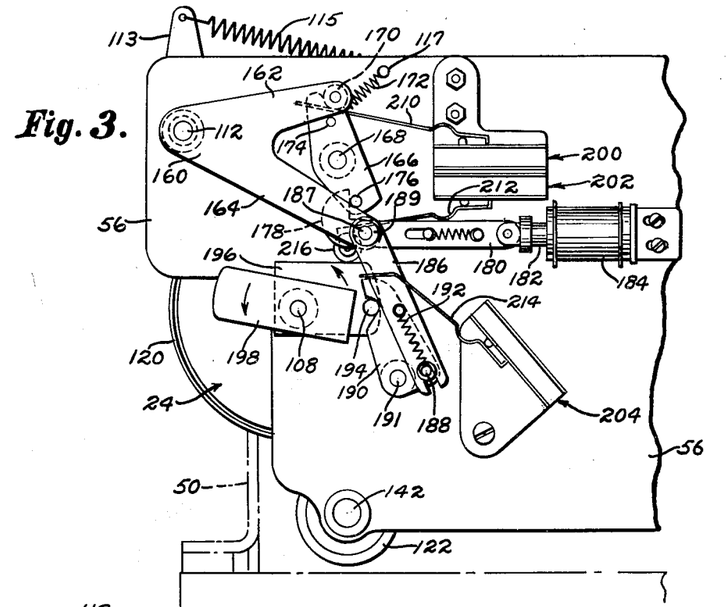
FIG. 3 is a fragmentary rear view of the machine.
Figure 4:
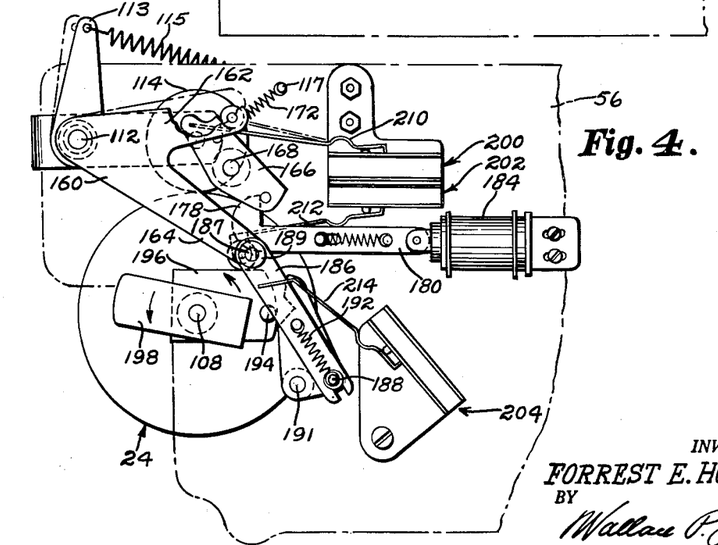
FIG. 4 is a view similar to FIG. 3 showing certain of the operating parts in positions they will assume on initiation of a cycle of operation of the machine.
Figure 5:
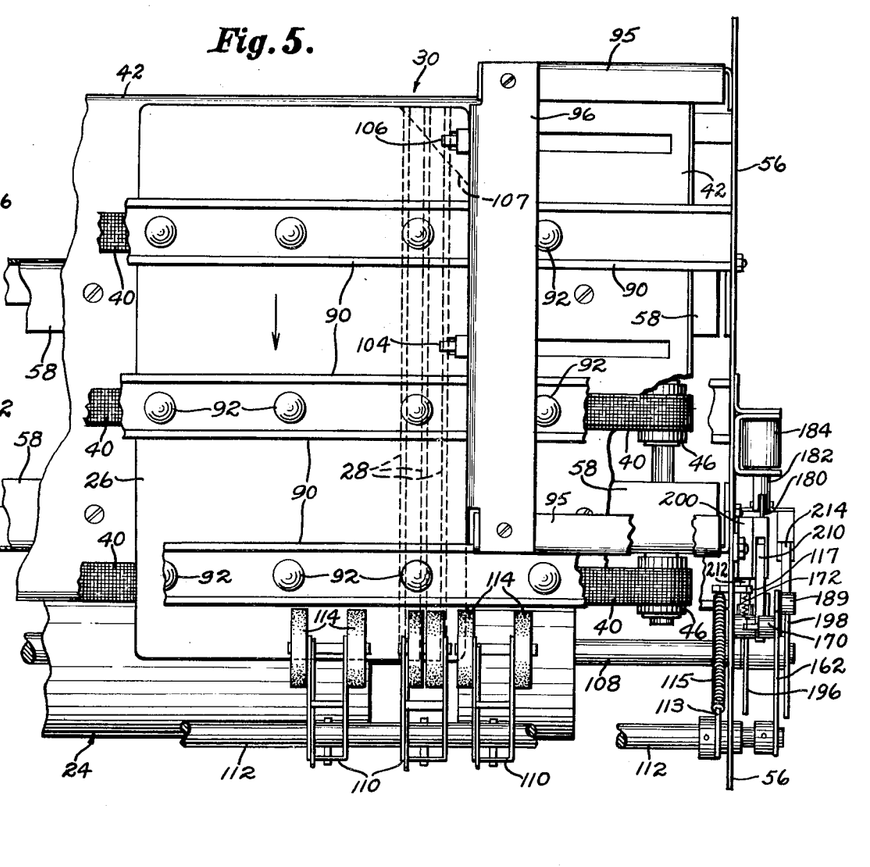
FIG. 5 is an enlarged fragmentary plan view of the machine.
Figure 6:
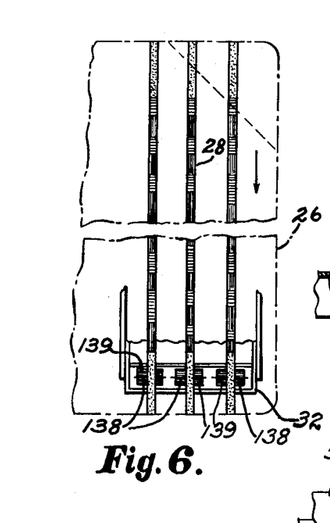
FIG. 6 is a fragmentary plan view illustrating a card in registry with a magnetic read device.

On the back of the plate 56, there is a lever 160 fixed to the outer end of shaft 112, the lever 160 being of the bell crank type having an upper lever arm 162 and a lower lever arm 164. The lever 160 has a normal position shown in FIG. 3 which corresponds to the starting or rest position of drum 24 and the lever is normally retained in this position by a latch member 166 that is pivoted at 168 on plate 56. The latch member 166 has an upper arm in the end of which is provided a retaining notch or recess to receive a roller 170 carried by the end of lever arm 162, and a spring 172 acts to urge the latch member 166 clockwise as seen in FIG. 3 into latching relation with the roller 170. One end of the spring 172 is attached to a stud 174 on latch 166 and the other end of the spring is anchored to stud 117 and thus to supporting plate 56.

The lower end of the latch member 166 carries a laterally projecting stud 176 that is engaged by the hooked end 178 of a link 180 which is connected to the plunger 182 of a solenoid 184 mounted on plate 56. When the solenoid 184 is energized, the latch 166 is rotated clockwise as viewed in FIG. 3, which releases lever 160 whereupon spring 115 rotates shaft 112 to lower the pressure rollers 114 to press the card at the registering station into feeding relation with the drum 24.

To the lower end of the bell crank arm 164 is pivotally connected one end of a link 186, the other end of the link having a longitudinal slot to receive a stud 188 carried by a latch member 190 that is pivoted, as at 191, on plate 56. A pin 187 connects the lower end of arm 164 to the upper end of link 186 and on the pin 187 is a cam follower or roller 189. A coil spring 192 has one end connected to a stud on link 186 and the other end connected to the stud 188 on latch member 190, the spring 192 yieldingly urging the stud 188 toward the end of the slot in link 186 to hold the latch member 190 in its normal position shown in FIG. 3. In this normal position, a notch or recess in latch member 190 receives a stud 194 carried by a timing cam 196 that is fixed to and thus rotates with drum shaft 96. The latch 190 releasably holds cam 196 in its starting position and thus holds the drum 24 in a starting position related to the normal "up" position of the pressure rollers 114. Also fixed to the drum shaft 96 for rotation therewith is a second timing cam 198, the function of which is hereinafter described.

Mounted on the plate 56 are three switches including a normally open switch 200, a second normally open switch 202 and a normally closed switch 204. The normally open switch 200 is actuated by spring 115 upon retraction of latch 166 by solenoid 184 and thus is under control of the card actuated switch 100. The second normally open switch 202 together with timing cam 196 and card actuated switch 102 controls the circuit of the magnetic read device 32. The normally closed switch 204 actuated by timing cam 198 functions to open the circuit of the magnetic read device 32 after the information portions of the stripes have passed the device and also functions to relatch the lever 164 with latch member 166. The switches 200, 202 and 204 are similar, each having a switch operator or arm 210, 212 and 214, respectively. Switch operator 210 extends under and engages the roller 170 of lever arm 162 such that when the lever pivots clockwise (FIG. 3) on the lowering of pressure rollers 114, the switch operating arm 210 will be pivoted thereby to close switch 200. On the free end of the switch operator 212, a roller 216 is preferably provided to engage the periphery of timing cam 196 which on rotation with drum 24 closes the switch 202. The switch arm 214 of the normally closed switch 204 extends into the path of cam 198 which opens switch 204 for an interval to de-energize the circuit of the magnetic read device 32.

Figure 9:
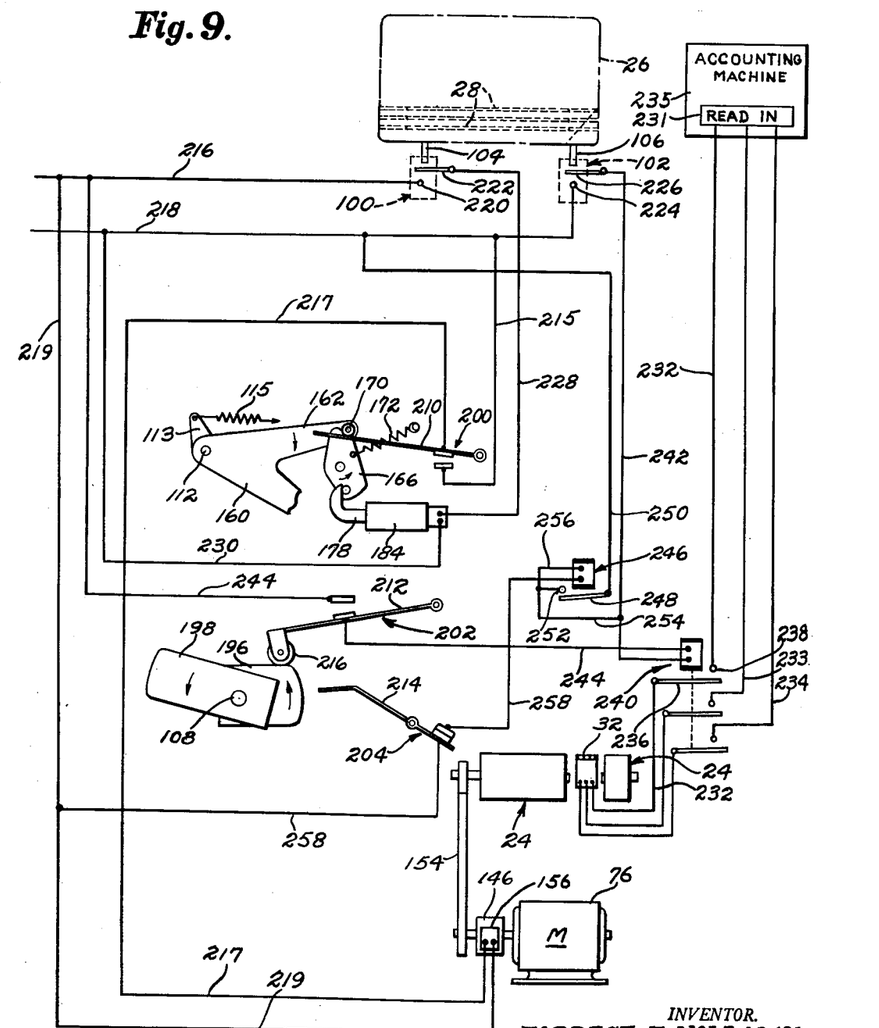
FIG. 9 is a diagrammatical view illustrating certain of the controls of the machine and circuitry therefor.

Referring now more particularly to FIG. 9, the diagrammatic illustration of the machine controls and circuitry therefore includes the usual main leads 216 and 218 for connection to a source of electric power, such as a 125 v. direct current source. In lead 216 is the card actuated switch 100 which is represented as comprising the usual fixed contact 220 and movable contact 222. In lead 218 is the other card actuated switch 102 which like switch 100 is represented as comprising the usual fixed contact 224 and movable contact 226. The solenoid 184 is connected across the leads 216 and 218 by a lead 228 to switch contact 222 and by a lead 230 to main lead 218. A lead 215 connects the fixed contact of switch 200 to main lead 218 and a lead 217 connects the movable contact 210 to one terminal of the clutch solenoid 156 which has its other terminal connected by a lead 219 to lead 216. The magnetic read device 32 is represented as being electrically connected by leads 232, 233 and 234, to a read-in device 231 of a calculating machine 235 such as the machine of the above mentioned application of William W. Deighton. In lead 232 are the conventional contacts 236 and 238 of a relay 240, the coil of which is connected at one end thereof by a lead 242 to contact 226 of card actuated switch 102 and at the other end by a lead 244 to main lead 216 through the contacts of timing switch 202.

In order that relay 240 is not de-energized the instant that the card moves away from and releases switch 102, a holding relay 246 is provided having one contact, as at 248, connected by a lead 250 to lead 218 and the other contact, as at 252, connected by a lead 254 to lead 242. From one end of the coil of holding relay 246, a lead 256 connected to lead 254 and from the other end of the coil, a lead 258 connects to lead 216 through the normally closed contacts of switch 204 and lead 219 such that the holding circuit is de-energized on opening of the contacts of switch 204.

In operation of the card feed machine, a card 26 is fed onto the conveyor 22 and the constantly running belts 40 feed the card to the registering station 30, forcing the lead edge of the card against the registering bar 96 until the entire card edge abuts the bar. In this position, the magnetic stripes 28 on the card are in registry with the openings in the read head device 32 and also a side margin of the card is in overlying relation to the periphery of drum 24. When the card is forced against the registering bar 96 by the feed belts 40, the card closes both of the switches 100 and 102, providing, of course, that the card is to be read and thus has its detachable left leading edge corner intact. In any event, the closing of card actuated switch 100 energizes solenoid 184 which operates hook 178 to release latch 166 so that spring 115 is free to move pressure rollers 114 down against the card. At substantially the same time that the rollers 114 engage the card, the clutch solenoid 156 is energized by the closing of switch 200 which initiates one revolution of operation of the drum 24. On initial rotation movement of the drum 24, while the card is still holding switch 102 closed, the cam 196 closes switch 202 which energizes the relay 240 and thus the circuit of the magnetic read device 32 and also the holding relay 246 is energized to hold the circuit of the read device 32 energized after card 26 has released switch 102. As the drum 24 approaches completion of its one revolution of operation, cam 198 rotating therewith opens switch 204 which de-energizes the circuit of the magnetic read device 32. This is followed by the cam 198 engaging roller 189 and pivoting the lever 162 counterclockwise as viewed in FIG. 3 whereupon spring 172 moves latch member 166 into holding relation with lever 160. At the same time, link 186 is moved upwardly and stud 194 engages in latch relation with latch member 190.

It has been found desirable to keep a stack of record cards together in a certain order even though one or more of the cards may be filled or for some other reason should not be read by the magnetic read device 32. To accomplish this, cards that are not to be read by read device 32 each have a leading edge corner removed along the dot and dash line shown to clear and thus avoid actuation of the switch 102 by the card when the card engages the registering bar 96. It will be apparent that when switch 102 remains open, the circuit of the magnetic read device remains de-energized. However, the closing of switch 100 by the card causes the energization of both the solenoid 184 and the one revolution clutch solenoid 156 with the result that rollers 114 and drum 24 cooperate to feed the card past the read device 32 and to the stack in the receptacle 126. Thus, card actuated switch 100 controls feeding of cards to the read device 32 irrespective of operation of card actuated switch 102 which controls the sending of pulses, generated by the read device 32, to the read-in device 131 of the accounting machine.

The normally open switch 202 and the normally closed switch 204 are provided so that the read device 32 will not be energized during the passing thereby of the leading and trailing edges of the card and of end portions of the stripes as said edges and end portions affect the read device causing the transmission of erroneous information.

From the above description, it will now be understood that I have provided an improved machine for feeding record cards to a magnetic reading device for reading certain information contained in one or more magnetic stripes on the card. It will be appreciated that the cooperative relationship of the several elements of the machine make it possible to feed the cards from a stack arranged such that the cards are fed onto the conveyor with the magnetic strips transverse to the direction of travel of the cards. This makes it possible to stack the cards at the feed end of the machine without the added thickness of the magnetic stripes causing the stack to be higher at one side than at the other. Instead, the card stack will be higher at the front than at the rear, but this is not objectionable where conventional, lateral positioned, two finger suction feeders are employed, such as the feeder of the above mentioned patent application of Roy L. Phelan. Also, I have provided a card feed machine in which the travel of a card in the initial feed direction is interrupted at a registering station where card actuated controls initiate travel of the card transversely of the first path into reading relation with a reading device at the side of the machine. In addition, I have provided an improved control system for controlling the feeding of the card from the card registering station to the reading device, the entire system being under control of a card actuated switch at the card registering station.

While I have shown and described my invention in considerable detail, it will be understood by those skilled in the art that many variations and changes may be made without departing from the spirit and scope of the invention.

What is claimed is:

1. In a machine for handling record cards having magnetic information thereon to be read, means operable to feed a card along a path of travel to a registering station, a magnetic read device disposed laterally of the path of travel of the card and adapted to generate electrical pulses representative of the magnetic information on the card, a read-in device in circuit with said magnetic read device, registering means at the registering station to align the card with respect to said magnetic read device, normally inactive feed means operable when activated to feed the card from the registration station along a second path of travel transverse to the first and into reading relation with said magnetic read device, electrically operated means operable to activate said normally inactive feed means, and switch means actuated by the card and controlling activation of said electrically operated means and also controlling the circuit of said magnetic read device.

2. In a machine for handling record cars having magnetic information thereon to be read; feed means operable to feed a card along a path of travel to a registering station, a normally inactive electrically operated read device disposed laterally to the path of travel of the card and operable to generate electrical pulses representative of the information on the cards, registering means at the reading station against which the card is urged by said feed means to align the magnetic information with said read device, normally inactive feed means operable when activated to feed the card from the registering station along a second path of travel transverse to the first and into reading relation with said read device, a read-in device in circuit with said read device, electrically operated means operable to activate said normally inactive feed means, and a pair of switches at said aligning station activated by a card to energize the electrically operated means and also control the circuit of the read and read-in devices.

3. In a machine for handling record cards having a magnetic stripe thereon containing information to be read at a reading station, feed means operable to feed a card along a first path of travel to a registering station with the stripe transverse to the path of travel, a magnetic read device disposed laterally of the first path of travel and operable in response to the information on the magnetic stripe to generate electrical pulses representative thereof; registering means at the registering station against which the card is urged by the feed means to align the magnetic stripe with said read device, normally inactive feed means disposed laterally of the first path of travel and operable when activated to feed the card from the registering station past said magnetic read device, a read-in device in circuit with said magnetic read device, switch means actuated by the card on registration of the latter with the magnetic stripe and controlling said normally inactive feed means and the circuit of the read-in and magnetic read devices, and timing means controlled by said normally inactive feed means and determining the interval of control of the circuit of the read-in and magnetic read devices by said switch means.

4. In a machine for handling a record card having a magnetic stripe thereon containing information to be read at a reading station, feed means operable to feed a card along a horizontal path of travel to the registering station with the stripe transverse to the path of travel, a read device laterally positioned from the path of travel and responsive to the information to generate electrical pulses representative thereof, registering means limiting movement of the card along the path of travel at the registering station and aligning the magnetic stripe with said read device, a drum laterally positioned from the path of travel and having its axis of rotation parallel thereto, said drum normally inactive and positioned such that a portion of the card at the registering station overhangs the drum periphery, normally retracted pressure rollers movable to engage the overhanging card portion and cooperative with said drum to feed the card from the registering station along a path transverse to the first path and past said read device, electrically operated means to move said pressure rollers into engagement with the card, a normally disengaged clutch operable to couple said drum to a power source and controlled by said electrically operated means, a read-in device in circuit with said read device to receive pulses therefrom, timing means controlling the circuit of said read-in and read devices and controlled by said clutch, and switch means at said registering station actuated by the card and controlling said clutch and said electrically operated means.

5. In a machine for feeding a rectangular record card having on one side thereof a stripe of magnetic material containing information to be read, supporting means, continuously operating horizontal conveyor belts on said supporting means operable to move the card along one path of travel with the stripe of magnetic information transverse to the path of travel, a magnetic read device operable in response to the magnetic information to generate electrical impulses representative thereof, said magnetic read device disposed laterally of the conveyor belts, a read-in device in circuit with said magnetic read device to receive electrical pulses therefrom, a registering bar across the conveyor belts to stop the card and in cooperation with the continuously operating belts to align the stripe on the card for passage longitudinally in reading relation to said magnetic read device, a normally inactive drum to feed the card along a path of travel transverse to the first path of travel and in reading relation with said magnetic read device, said drum having its periphery in the first path of travel of the card and normally ineffective to feed the card along the second path of travel, normally ineffective pressure rollers movable into position to press the card against the periphery of the drum to effect feeding of the card along the second path of travel, switch means mounted on said registering bar controlling movement of said pressure rollers into engagement with the card, and switch actuating means rotating with said drum controlling the circuit of said read-in and magnetic read devices and controlled by said switch means.

6. In a machine for feeding a rectangular sheet having an area thereof containing encoded information to be read, means operable to feed a sheet along a first path of travel to a sheet registering station, a read device disposed laterally of the path of travel and opposite the read station, said read device responsive to the encoded information and operable to generate electrical pulses representative of the information on the sheet, registering means at the registering station to align the sheet with respect to said read device, a normally inactive cyclically operable feed roller, a second and normally retracted feed roller cooperable with said first-mentioned feed roller to feed a sheet from the registration station along a second path of travel laterally to the first and into reading relationship to said read device, electrically operated means operable to activate said normally inactive feed roller, an electrically operated latch member holding said second roller retracted, and switch means actuated by and upon registering of a sheet with said registering means and operatively connected to and for controlling activation of said electrically operated means and said electrically operated latch member.

7. In a machine for handling record sheets having encoded information thereon to be read, means operable to feed a sheet along a path of travel to a sheet registering station, a read device disposed laterally of the path of travel of the sheet and opposite the registering station, said read device responsive to the encoded information on the sheet and operable to generate electrical pulses representative of the encoded information, a read-in device in circuit with said read device, registering means at the registering station to align the sheet with respect to said read device, normally inactive feed means operable when activated to feed the sheet from the registration station along a second path of travel transversely to the first and into reading relation with said read device, electrically operated means operable to activate said normally inactive feed means, and switch means at said registering station actuated by and upon registration of a sheet and electrically connected to control said electrically operated means and the circuit of said read-in and read devices.

8. In a machine for handling record sheets having encoded information thereon to be read and having means to feed the sheets singly along a path of travel, registering means across the path of travel to align a sheet for movement along a second path of travel transverse to the first, a cyclically operable normally inactive drum having its periphery projecting into the firset path of sheet travel to receive a sheet and having its axis of rotation transversely of the second path of sheet travel, a read device positioned at said drum and responsive to said encoded information to convert said information to representative electrical pulses, electrically operated means controlling said cyclically operated drum, a normally retracted pressure roller cooperable with said drum to feed a sheet along the second path past said read device, an electrically operated latch member normally holding said pressure roller retracted, and sheet actuated switch means at said registering means electrically connected to and for controlling operation of said latch member and said electrically operated means.

9. In a machine for handling record sheets having encoded information thereon to be read and means for feeding a sheet along a path of travel to a sheet to a sheet registering station, sheet registering means across the path of sheet travel at the registering station and defining one boundary of a second path of sheet travel extending laterally from the first path to a reading station, a normally inactive sheet feed drum having its axis of rotation transverse to the second path of sheet travel, electrically operated means controlling the cycling operation of said drum, a normally retracted pressure roller cooperable with said drum, said drum and pressure roller positioned to receive a margin of said sheet, an electrically operated latch member normally holding said pressure roller retracted, a normally open switch member at said registering means and closable by a registered sheet, said normally open switch member electrically connected to and controlling said electrically operated latch member, a second switch member actuated by the movement of said pressure roller into engagement with said drum and operable to activate said electrically operable means to effect a cycle of operation of said drum, a read-in device in circuit with said read device, a drum actuated switch member, and a second sheet actuated switch member at said registering means, said drum actuated switch member and said second sheet actuated switch member electrically connected for mutually controlling the circuit of said read and read-in devices.

References Cited in the file of this patent

UNITED STATES PATENTS

| | | |
|---|---|---|
| 2,902,329 | Brink et al. | Sept. 1, 1959 |
| 2,970,878 | Cunningham | Feb. 7, 1961 |

FOREIGN PATENTS

| | | |
|---|---|---|
| 1,120,078 | France | Apr. 16, 1956 |